United States Patent
Yi et al.

(10) Patent No.: US 7,633,892 B2
(45) Date of Patent: Dec. 15, 2009

(54) APPARATUS AND METHOD FOR ENHANCED UM RLC DATA HANDLING

(75) Inventors: Seung-June Yi, Seoul (KR); Young-Dae Lee, Gyeonggi-Do (KR); Sung-Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 11/110,092

(22) Filed: Apr. 19, 2005

(65) Prior Publication Data

US 2005/0270996 A1   Dec. 8, 2005

(30) Foreign Application Priority Data

Apr. 19, 2004   (KR) ............... 10-2004-0026852

(51) Int. Cl.
*H04H 20/71* (2008.01)
*H04J 3/00* (2006.01)

(52) U.S. Cl. ............... 370/312; 370/300; 370/474; 370/476

(58) Field of Classification Search ............ 370/474, 370/389, 390, 391, 392, 393, 394, 349, 469, 370/335, 252, 337, 300, 476

See application file for complete search history.

(56) References Cited

U.S. PATENT DOCUMENTS

| 2002/0041567 A1* | 4/2002 | Yi et al. ............... 370/236 |
| 2002/0042270 A1* | 4/2002 | Yi ............... 455/424 |
| 2002/0110095 A1* | 8/2002 | Jiang et al. ............... 370/328 |
| 2002/0172208 A1 | 11/2002 | Malkamaki |
| 2002/0196760 A1* | 12/2002 | Malomsoky et al. ......... 370/338 |
| 2003/0007480 A1* | 1/2003 | Kim et al. ............... 370/349 |
| 2003/0128705 A1* | 7/2003 | Yi et al. ............... 370/394 |
| 2003/0157927 A1* | 8/2003 | Yi et al. ............... 455/411 |
| 2003/0210669 A1* | 11/2003 | Vayanos et al. ............. 370/335 |
| 2003/0223385 A1 | 12/2003 | Jiang |
| 2004/0033801 A1* | 2/2004 | Yi et al. ............... 455/428 |
| 2004/0057387 A1* | 3/2004 | Yi et al. ............... 370/252 |

FOREIGN PATENT DOCUMENTS

| EP | 1195923 A | 4/2002 |
| JP | 2003-339075 A | 11/2003 |
| KR | 2002-0028097 | 4/2002 |
| RU | 2198475 | 2/2003 |
| RU | 2226039 | 3/2004 |

OTHER PUBLICATIONS

"Universal Mobile Telecommunication System (UMTS); RLC Protocol Specification (3GPP TS 25.322 version 3.10.0 Release 1999)" ETSI TS 125 322 V3 10.0, Mar. 2002, pp. 1-74.

* cited by examiner

*Primary Examiner*—Lester Kincaid
*Assistant Examiner*—Daniel Lai
(74) *Attorney, Agent, or Firm*—Lee, Hong, Degerman, Kang & Waimey

(57) ABSTRACT

An unacknowledged mode (UM) radio link control (RLC) entity receives RLC protocol data units (PDUs) delivered through one or more logical channels and re-orders the received PDUs by referring to their sequence numbers and by using a receive window and a timer to minimize delivery delay time, to reduce missing PDUs received from each logical channel, and to process the PDUs by avoiding duplicate PDUs.

7 Claims, 9 Drawing Sheets

APPARATUS AND METHOD FOR ENHANCED UM RLC DATA HANDLING

CROSS REFERENCE TO RELATED APPLICATIONS

The present application claims the benefit of Korean application number 10-2004-026852 filed Apr. 19, 2004 the disclosure of which is incorporated herein by reference.

BACKGROUND AND SUMMARY

The present invention relates to an apparatus and method for a radio link control (RLC) layer in a terminal for receiving and processing data blocks (or units) corresponding to a particular service received from a plurality of cells in a UMTS (Universal Mobile Telecommunications System) type IMT-2000 system. In particular, the present invention relates to an apparatus and method for a radio link control (RLC) layer for receiving and processing data blocks corresponding to a particular service received from a plurality of cells, wherein an RLC entity operating in unacknowledged mode (UM) uses a window and a timer, or state variables to deliver (transfer, send, transmit, etc.) the data blocks received from a plurality of cells to an upper layer with minimal delay time, omission or losses and without duplicate data blocks (or units).

FIG. 1 illustrates an exemplary basic architecture of a UMTS network. As shown in FIG. 1, the UMTS is roughly divided into a terminal 100 (mobile station, user equipment (UE), etc.), a UMTS Terrestrial Radio Access Network (UTRAN) 120, and a core network (CN) 130. The UTRAN 120 includes one or more radio network sub-systems (RNS) 125. Each RNS 125 includes a radio network controller (RNC) 123, and a plurality of base stations (Node-Bs) 121 managed by the RNC 123. One or more cells exist for each Node B 121.

FIG. 2 illustrates a radio interface protocol architecture that exists in the mobile terminal and in the UTRAN as one pair, for handling data transmissions via the radio interface. Regarding each radio protocol layer, the first layer (Layer 1) is a physical layer (PHY) that serves the purpose of transmitting data over the radio interface by using various radio transmission techniques. The PHY layer is connected with an upper layer, the medium access control (MAC) layer via transport channels, which include a dedicated transport channel and a common transport channel depending upon whether that channel is shared or not.

In the second layer (Layer 2), a MAC layer, a radio link control (RLC) layer, a packet data convergence protocol (PDCP) layer and a broadcast/multicast control (BMC) layer exist. The MAC layer serves the purpose of mapping various logical channels to various transport channels, as well as performing logical channel multiplexing for mapping a plurality of logical channels to a single transport channel. The MAC layer is connected to a higher layer, the RLC layer, via logical channels, and these logical channels are divided into control channels that transmit control plane information and traffic channels that transmit user plane information.

The RLC layer handles the guaranteeing of the quality of service (QoS) of each radio bearer (RB) and the transmission of the corresponding data thereof. To guarantee the unique QoS of a radio bearer, the RLC layer has therein one or two independent RLC entities for each radio bearer, and provides three types of RLC modes; a transparent mode (TM), an unacknowledged mode (UM), and an acknowledged mode (AM), in order to support the various QoS. Also, the RLC layer adjusts the data size accordingly such that a lower layer may transmit data over the radio interface, by performing segmentation and concatenation on the data received from an upper layer.

The PDCP layer is located above the RLC layer and allows data that is transmitted by using Internet Protocol (IP) packets, such as IPv4 or IPv6, to be effectively transmitted over a radio interface having a relatively smaller bandwidth. For this purpose, the PDCP layer performs a header compression function, whereby only the absolutely necessary data in the header portion of the data are transmitted, in order to increase transmission efficiency over the radio interface. Because header compression is its basic function, the PDCP layer only exists in the PS (packet switched) domain, and a single PDCP entity exists per each radio bearer (RB) for providing effective header compression function with respect to each PS service.

Additionally, in the second layer (L2), a BMC (Broadcast/Multicast Control) layer exists above the RLC layer for performing the functions of scheduling cell broadcast messages and broadcasting to terminals located in a particular cell.

The radio resource control (RRC) layer located at the lowest portion of the third layer (L3) is only defined in the control plane, for controlling the parameters of the first and second layers and for controlling the transport channels and the physical channels in relation to the configuration, the re-configuration, and the releasing of the radio bearers (RBs). Here, the RB refers to a logical path provided by the first and second layers of the radio protocol for data delivery between the terminal and the UTRAN. And in general, configuration of a radio bearer (RB) refers to regulating the protocol layers and the channel characteristics of the channels required for providing a specific service, as well as setting their respective specific parameters and operation methods.

The RLC layer will be explained in more detail hereafter. The basic function of the RLC layer is to guarantee the QoS (Quality of Service) of each RB and transmitting data accordingly. As the RB service is a service that is provided from the second layer of the radio protocol to an upper layer, the entire second layer affects the QoS, and in particular, the effect of the RLC is great. For the RLC to guarantee the QoS that is unique to that RB, an independent RLC entity is provided for each RB and to support various QoS, three types of RLC modes; Transparent Mode (TM), Unacknowledged Mode (UM), and Acknowledged Mode (AM) are provided. Each of these three RLC modes respectively supports different QoS, the operation methods thereof are different and there are differences in their detailed functions as well. Thus, the RLC should be considered in more detail according to their operation modes.

TM RLC is a mode in which no overhead is attached to the RLC SDU (Service Data Unit) received from an upper layer when constituting a RLC PDU (Protocol Data Unit). Namely, the RLC passes the SDU in a transparent manner, thus it is called TM RLC, and due to such characteristics, the user plane and the control plane performs the following functions. In the user plane, because the data processing time within the RLC is short, transmission of real-time circuit service (CS) domain data such as voice and streaming in the CS domain are mainly handled. In the control plane, because there is no overhead within the RLC, the uplink transmission of RRC messages from any terminal and the downlink transmission of RRC messages that are broadcast to all terminals within a cell region are handled.

Unlike transparent mode, the mode in which overhead is added at the RLC is called non-transparent mode, and there are two types with respect to whether receipt of the transmitted data is unacknowledged (UM: unacknowledged mode) or acknowledged (AM: acknowledged mode). UM RLC transmits data by adding to each PDU, a PDU header that includes a sequence number (SN), such that the receiving end can know which PDU had been lost during transmission (i.e., the PDU is missing). When considered from the transmitting side RLC, if the transmitting side operates in unacknowledged mode, it does not check whether the receiving end properly received the corresponding PDU, and once a PDU is transmitted, it is not re-transmitted. When considered from the receiving end RLC operating in unacknowledged mode, the PDUs that have been missing are determined by referring to the sequence numbers of the received PDUs, and for those PDUs determined to be missing, waiting is not performed and a received PDU is delivered immediately to the upper layer. For example, when a UM RLC first receives a RLC PDU having SN=3 and then receives a RLC PDU having SN=6, the UM RLC determines that receipt of the RLC PDU having SN=4 and the RLC PDU having SN=5 was unsuccessful and no longer waits for these two RLC PDUs. Due to such function, the UM RLC mainly handles, in the user plane, the transmission of broadcast/multicast data and the transmission of real-time packet data such as voice (e.g., VoIP: Voice over IP) or streaming of the packet service (PS) domain, while in the control plane, the transmission of RRC messages that do not need receipt acknowledgement among those RRC messages transmitted to a particular terminal or terminal group within a cell region.

As one type of non-transparent mode, AM RLC constitutes a PDU by attaching a PDU header that includes a SN as done in UM RLC, but unlike UM RLC, the receiving end provides acknowledgement for the PDU transmitted by the transmitting end. In AM RLC, the reason that the receiving end provides acknowledgement is to request re-transmission from the transmitting end of those PDUs that were not received, and this re-transmission function is one of the most important characteristics of the AM RLC. The ultimate purpose of this is for the AM RLC to guarantee error-free data transmissions through re-transmissions, and due to this purpose, the AM RLC mainly handles non-real-time packet data transmissions such as TCP/IP of the PS domain in the user plane.

The UM RLC will be explained in more detail hereafter. The UM RLC sets and manages a state variable called 'VR (US)' which refers to the next sequence number that is expected to be received, namely, the very next sequence number after the sequence number of the RLC PDU that was most recently received. Thus, if the most recently received SN=x, then VR(US)=x+1.

The UM RLC of the transmitting end receives RLC SDUs (Service Data Units) from an upper layer, performs segmentation or concatenation thereto to generate data units of appropriate size and sequence numbers are sequentially allocated to each in order to form RLC PDUs which are then delivered to a lower layer. Also, the UM RLC includes length indicators (LI) in the RLC PDU that indicate the location of boundaries between RLC SDUs within a RLC PDU, in order to allow proper reassembling (reconstructing) of the RLC SDU from the RLC PDU at the receiving end.

Here, the sequence number can be expressed in 7 bits. By expressing the sequence number in this simple manner, the header portion of each RLC PDU can be minimized and the transmission efficiency of the data to be sent can be increased. Thus, the sequence number values that are actually included in the RLC PDUs are from 0 to 127. The transmitting side sequentially allocates sequence numbers starting from 0 to each RLC PDU, and after the number 127 has been allocated, the sequence numbers beginning from 0 are used again. As such, when a sequence number (e.g., 0) is allocated after a larger sequence number (e.g., 127), this is referred to as a 'wrap-around' situation. Thus, the RLC PDUs having sequence numbers allocated after a wrap-around situation should be delivered after the RLC PDUs having sequence numbers allocated before the wrap-around situation. The receiving end always checks the sequence numbers (SN) of the received RLC PDUs, and if the SN of the received RLC PDU is smaller than the SN of the last received RLC PDU, it is determined that a wrap-around situation has occurred and it is assumed that all subsequently received RLC PDUs would be RLC PDUs that should be sequentially after the previously received RLC PDUs.

FIG. 3 depicts the operation of the UM RLC at the receiving end according to the related art when a RLC PDU is received from a lower layer.

First, the VR(US) is updated (re-set) to match the SN value of the received RLC PDU. Second, if the update interval of the VR(US) is not 1 in the above first step, it is determined that there is at least one missing RLC PDU, and all RLC SDUs related to the one or more missing RLC PDUs are discarded. Otherwise, if the update interval is 1, then the next step is performed. Third, a reassembly procedure is performed by using the successfully received RLC PDUs, and then only those successfully reassembled RLC SDUs are sent to the upper layer and the operation is completed.

Hereafter, multimedia broadcast/multicast service (MBMS) will be described. MBMS refers to a downlink transmission service for providing data services such as, streaming services (e.g., multimedia, video on demand, webcast, etc.) or background services (e.g., e-mail, short message services (SMS), downloading, etc.), to a plurality of terminals by employing a downlink dedicated MBMS bearer service. A single MBMS service is comprised of one or more sessions, and MBMS data is transmitted to the plurality of terminals through an MBMS radio bearer while a session is ongoing.

MBMS can be classified into a broadcast mode and a multicast mode. The MBMS broadcast mode refers to transmitting multimedia data to all users within a broadcast area, which is a region where broadcast service is possible. In contrast, MBMS multicast mode refers to transmitting multimedia data to only a certain specified user group within a multicast area, whereby a multicast area, which is a region where multicast service is possible.

The UTRAN employs a radio bearer to provide a MBMS bearer service to a terminal. The types of MBMS bearers used by the UTRAN include a point-to-multipoint (p-t-m) radio bearer and a point-to-point (p-t-p) radio bearer. Here, the point-to-point radio bearer (RB) is a bi-directional RB that comprises a logical channel DTCH (Dedicated Traffic CHannel), a transport channel DCH (Dedicated CHannel), and a physical channel DPCH (Dedicated Physical CHannel). The point-to-multipoint RB is a uni-directional downlink RB that comprises a logical channel MTCH (MBMS Traffic CHannel), a transport channel FACH (Forward Access CHannel), and a physical channel SCCPCH (Secondary Common Control Physical CHannel). A logical channel MTCH is configured for each MBMS service provided to one cell, and is used to transmit user plane data of a particular MBMS service to a plurality of terminals.

The UTRAN providing the MBMS service transmits via the logical channel MCCH (MBMS Control CHannel), MBMS-related RRC messages, namely, control messages to a plurality of terminals. Here, the MCCH is a point-to-multipoint downlink channel, and is mapped to a transport channel FACH (Forward Access CHannel), while the transport channel FACH is mapped to a physical channel SCCPCH (Secondary Common Control Physical CHannel). Examples of MBMS-related RRC messages transmitted through the MCCH include MBMS service information and MBMS radio bearer information. Here, MBMS service information transmits to the terminals wishing to receive the MBMS service, an ID (identification) list of MBMS services that are ongoing in a corresponding cell and transmits the type of radio bearer for the corresponding MBMS service. Also, when a particular MBMS service uses a point-to-multipoint radio bearer for a corresponding cell, the MBMS radio bearer information transmits information about the point-to-multipoint radio bearer for that service to those terminals that wish to receive that service.

A terminal that wishes to receive a particular MBMS service by using a point-to-multipoint radio bearer receives MBMS service information through the MCCH. If the MBMS service information received by the terminal instructs that the MBMS radio bearer information should be received for a particular MBMS service, the terminal obtains through the MBMS radio bearer information, the necessary information for configuring a MBMS radio bearer at the terminal for receiving the particular MBMS service. Namely, if the MBMS service information received by the terminal includes the ID of a particular MBMS service, and if the type of radio bearer for the particular MBMS service is informed to be a point-to-multipoint type, the terminal receives the MBMS radio bearer information to obtain the point-to-multipoint radio bearer information, and configures a point-to-multipoint radio bearer at the terminal by using this information.

In the related art, when a point-to-multipoint radio bearer is configured in a cell region for a particular MBMS service, because a plurality of terminals commonly receive service data through the point-to-multipoint radio bearer, the UTRAN cannot appropriately configure the point-to-multipoint radio bearer for each terminal having respectively different reception conditions. Thus, when a point-to-multipoint radio bearer is configured, the probability of unsuccessful data reception by the terminal is higher than that when a point-to-point radio bearer is configured.

To reduce such probability of unsuccessful data reception by the terminal, when a MBMS service is transmitted from a cell through a point-to-multipoint radio bearer, the terminal searches the neighboring cells and additionally receives that MBMS service through the point-to-multipoint radio bearer provided from one or more of those neighboring cells to thus receive the MBMS service data that is desired. Namely, when a particular MBMS service is provided through a point-to-multipoint radio bearer from the cell (region) in which the terminal is located in, even if the reception of some data is unsuccessful, such data can be received from one or more other cells that have the point-to-multipoint radio bearer configured therein, and thus unsuccessfully data receptions can be minimized.

However, in the related art, the UM RLC entity at the receiving end receives RLC PDUs from only a single cell or only a single logical channel, and upon checking the sequence number of each RLC PDU, no longer waits to receive those RLC PDUs that have been determined to be missing (lost), all RLC SDUs related to any unsuccessfully received RLC PDU are discarded (deleted), and only the successfully received RLC PDUs are processed.

But, this causes serious problems when data is received through a point-to-multipoint radio bearer from multiple cells or when data is received through multiple logical channels, such as in MBMS service. This is because the points of time when a terminal receives the data of a particular service from each cell are different. For example, FIG. 4 assumes that data of a single MBMS service is received from Cell A and from Cell B. According to the related art operation, if the UM RLC receives a RLC PDU having SN=5, the VR(US) is updated, while the RLC PDU having SN=3 and the RLC PDU having SN=4 are considered to be unsuccessfully received and no longer waits to receives these RLC PDU. Then, the RLC SDU including the RLC PDU having SN=5 is reassembled and sent to the upper layer. As can be understood from FIG. 4, even though the terminal could receive a PDU having SN=3 from Cell B, the RLC PDUs having SN=3 and SN=4 are considered to be not receivable, and has the problem of processing the RLC PDU having SN=5 before the RLC PDUs having SN=3 or SN=4 are received.

Also, upon receiving a RLC PDU having SN=5 from Cell A, the UM RLC updates the VR(US) to 6, and if a RLC PDU having SN=3 is received thereafter from Cell B, the UM RLC determines that a wrap-around situation has occurred because the currently received RLC PDU (having SN=3) has a lower sequence number than the last received RLC PDU (having SN=5). Thus, the UM RLC determines that the currently received RLC PDU (having SN=3) is a new RLC PDU that was generated after the RLC PDU having SN=5, and the problem of undesirably updating the VR(US) to 4 and processing the RLC PDUs thereafter occurs. If the RLC PDU having SN=5 is received from Cell B after the VR(US) was updated to 4, there is a problem in that the RLC PDU having SN=5 (received from Cell B) is processed again, because a RLC PDU having SN=5 had been previously received from Cell A and already processed. In such case, the length indicator information included in the RLC PDU and the mapping between the RLC PDUs do not match one another, thus resulting in the serious problem of not allowing the UM RLC to properly reassemble the RLC SDUs from the RLC PDUs. This also problematic because most services employing the UM RLC are applications require sequential reception of data, and such improper data reception causes problems in the operation of such applications.

The related art problems occurring due to non-sequential data reception at the UM RLC are addressed by the present invention to minimize delivery delay time, to reduce missing PDUs received from each logical channel, and to process the PDUs by avoiding duplicate PDUs.

Thus, in the present invention, an unacknowledged mode (UM) radio link control (RLC) entity receives RLC protocol data units (PDUs) delivered through one or more logical channels and re-orders the received PDUs by referring to their sequence numbers and by using a receive window and a timer.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
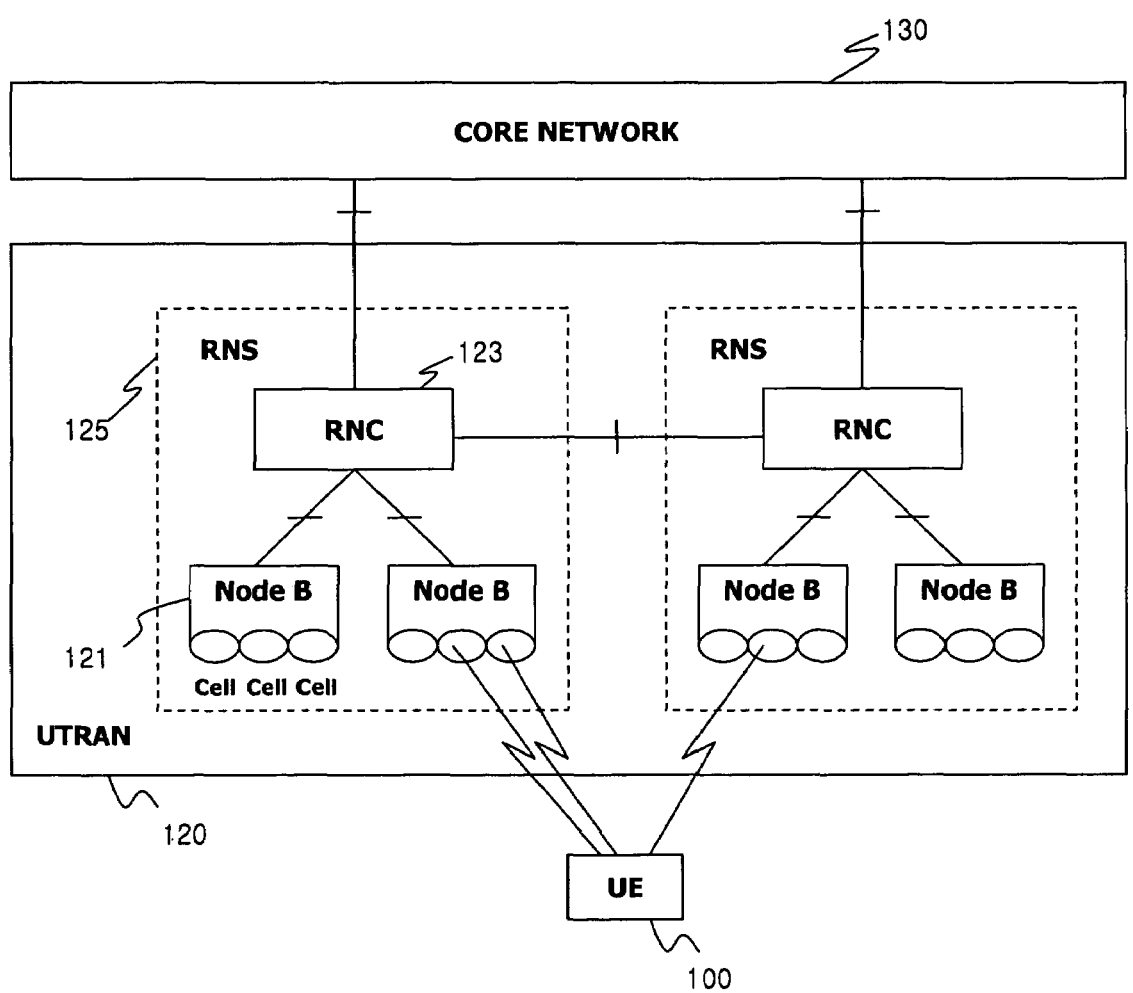
FIG. 1 depicts an exemplary basic structure of a UMTS network.
Figure 2:
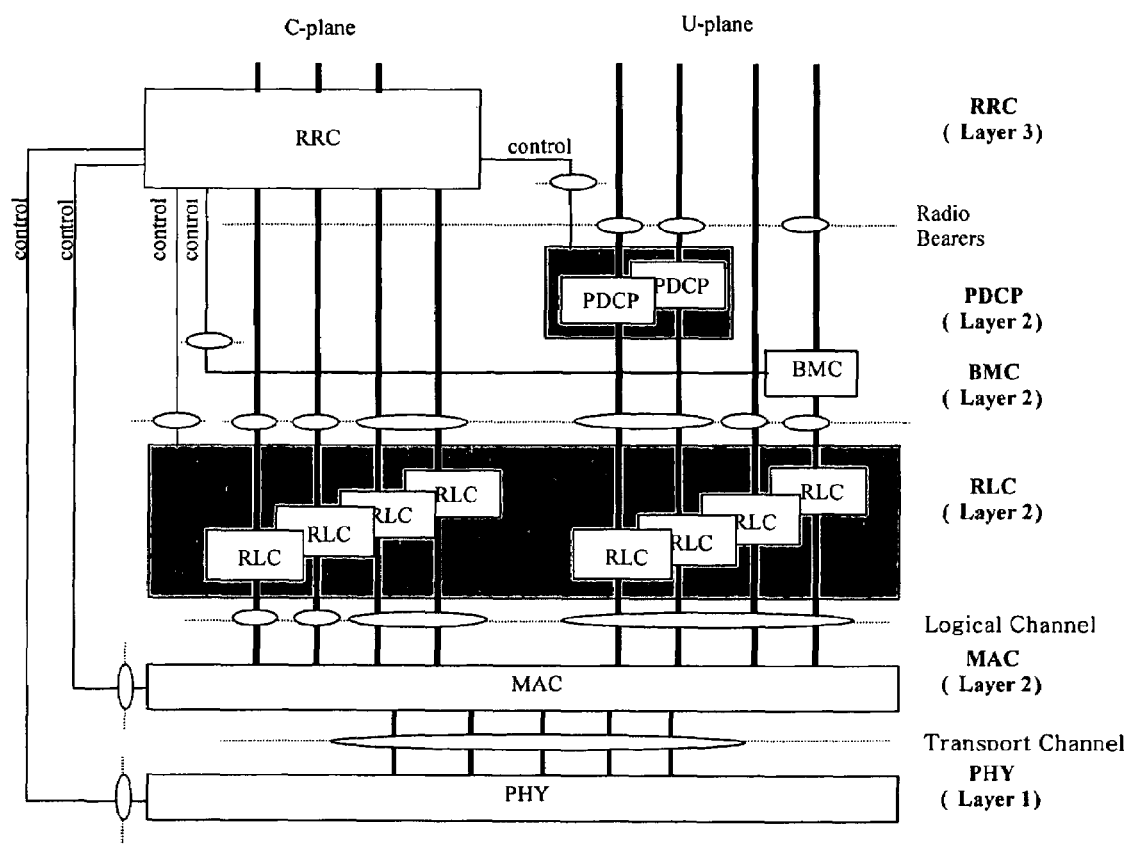
FIG. 2 depicts a radio access interface protocol architecture between the terminal and UTRAN that is based upon the 3GPP wireless access network.
Figure 3:
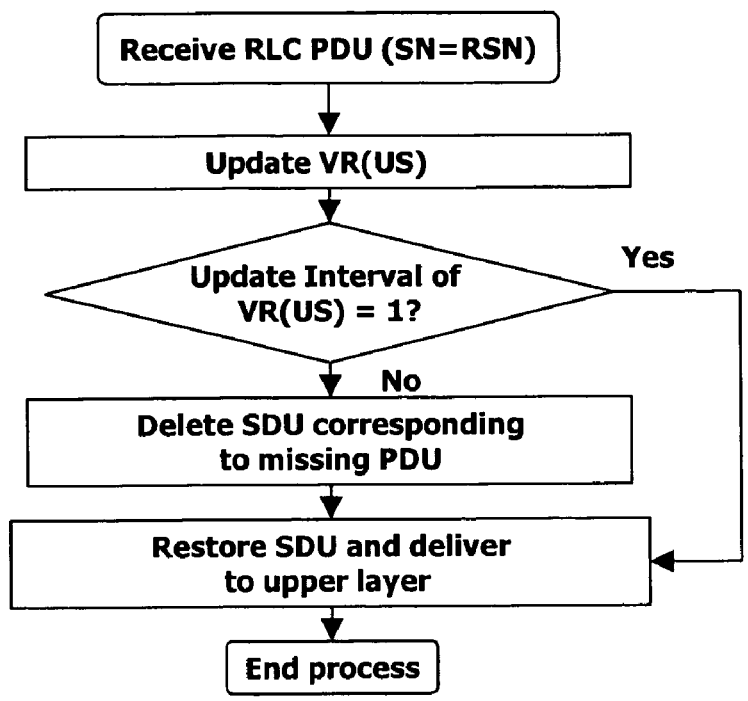
FIG. 3 depicts a flow chart of a data processing method of the UM RLC according to the related art.
Figure 4:
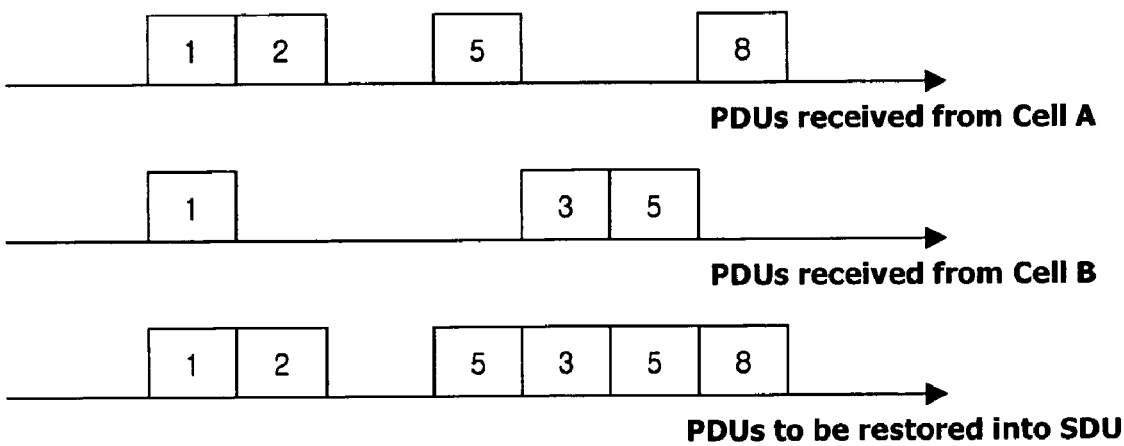
FIG. 4 depicts a data processing method of the UM RLC when data is received from multiple cells.

The following description is based upon the presently preferred exemplary and non-limiting embodiments of the present invention. More particularly, various inventive concepts and principles embodied in systems and methods therein are discussed and described.

To address the problems of the related art, when RLC PDUs are received from multiple cells or multiple logical channels, the present invention proposes that the UM RLC employ a receiving window and timer to process the received RLC PDUs.

Processing RLC PDUs using a receive window refers to a procedure in which the UM RLC manages the range of SN values of the RLC PDUs that can be expected to be received based upon a received RLC PDU.

Processing RLC PDUs using a timer refers to a procedure in which the UM RLC operates a reordering timer for those received RLC PDUs that remain in the receive window without having been reserved for reassembly, such that these RLC PDUs are processed after the lapse of a certain amount of time regardless of whether certain other PDUs are received or not.

If a reordering configuration is received from an upper layer through a reordering indication, the UM RLC can determine that RLC PDUs are to be received from multiple cells or from multiple logical channels and the UM RLC operates accordingly. If a reordering configuration is not received from the upper layer, then it is determined that RLC PDUs are to be received from a single logical channel as in the related art, and the UM RLC operates accordingly.

If configured to connect with multiple logical channels, the UM RLC can consider that reordering has been configured for all RLC PDUs to be subsequently received and thus operates accordingly.

The present invention proposes two embodiments. In the first embodiment, the following variables are additionally defined:

VR(UR): reception waiting number—this value is only used when reordering has been configured, and refers to the very next SN after the SN of the RLC PDU that has been sequentially received most recently.

VR(UH): maximum reception number—this value is only used when reordering has been configured, and refers to the upper limit value of the receive window in the UM RLC and is the next value (sequence number) after the highest sequence number among all sequence number of the received RLC SDUs. When a RLC PDU having SN=x that falls outside the receive window is received the VR(UH) is set as x+1. The initial value of VR(UH) is 0.

VR(UT): timer indication number—this value is only used when reordering has been configured, and is set to equal the SN value corresponding to the RLC PDU to which the reordering timer had been set.

Receive window size: this value refers to the size of the receive window.

Receive window: this is a value range for sequence numbers of RLC PDUs that the RLC entity receives and processes, and is defined to be equal to or greater than the VR(UH) value minus the receive window size, but lower than VR(UH) (i.e., [VR(UH)−receive window size]≦receive window≦VR(UH)).

Among the above, the three variables (VR(UR), VR(UH), VR(UT)) may also be defined in a slightly different manner when considering unacknowledged mode data (UMD) transfer procedures. First, the VR(UR) is equivalent to 'VR(UDR)', which is a UM duplicate avoidance and reordering send state variable. This state variable contains the sequence number of the next UMD PDU that is expected to be received in sequence. Second, the VR(UH) is equivalent to 'VR(UDH)', which is a UM duplicate avoidance and reordering highest received state variable. This state variable contains the sequence number of the highest numbered UMD PDU that has been received by the duplicate avoidance and reordering function. Third, the VR(UT) is equivalent to 'VR (UDT)', which is a UM duplicate avoidance and reordering timer state variable. This state variable contains the sequence number of the UMD PDU associated with a 'Timer_DAR' (Duplicate Avoidance and Reordering) when the timer is running. Here, the Timer_DAR is a timer used with the UM duplicate avoidance and reordering function, used to trigger the transfer of PDUs to the next in sequence UM RLC receiver function.

According to the first embodiment, when the UM RLC receives a new RLC PDU from a lower layer, it operates according to whether reordering had been configured or not, whereby the UM RLC operates as in the related art if reordering had not been configured, while the UM RLC operates according to the SN value of the received RLC PDU, the receive window, and the timer if reordering had been configured.

In the above procedure, the UM RLC operating as in the related art refers to the procedures of updating the VR(US) according to the SN value of the received RLC PDU, considering that there is at least one lost (missing) PDU if the VR(US) update interval is not 1, discarding those RLC SDUs related to the RLC PDUs that were considered to be missing, reassembling only those RLC SDUs considered to be successfully received and delivering such to an upper layer. If the VR(US) update interval is 1, it is considered that there are no lost (missing) PDUs, and the RLC SDUs are reassembled based upon the received RLC PDUs and delivered to the upper layer. Here, the RLC SDU related to the RLC PDU refers to the RLC SDU having a portion of its data or having a length indicator indicating the end of the RLC SDU being included within the RLC PDU.

In the above procedure, the UM RLC operating according to the SN value of the received RLC PDU, the receive window, and the timer refers to checking the newly received RLC PDU by using the RLC PDU SN value, the receive window, and the VR(UR), processing the corresponding RLC PDUs according to the checking result, additionally processing of the RLC PDUs according to whether there exists a RLC PDU having SN=VR(UR), and then additional processing by using a reordering timer, and additionally processing those RLC PDUs for which reassembly (reconstruction) had been reserved.

In the above procedure, the checking of the newly received RLC PDU by using the RLC PDU SN value, the receive window, and the VR(UR), and then processing the corresponding RLC PDUs according to the checking result will be explained in more detail hereafter. First, the UM RLC checks to see if the SN value of the received RLC PDU is located within the receive window. If so, if the SN value is lower than the VR(UR) or if the RLC PDU corresponding to that SN value had been previously received, the corresponding RLC PDU is discarded. If not, the corresponding RLC PDU is stored in the reception buffer at the location indicated by the SN value of that RLC PDU.

If in the above checking step, if the SN value of the RLC PDU is not within the receive window, the received RLC PDU is placed at the location indicated by the SN value of that RLC PDU, and the receive window location is updated by setting the VR(UH) value to equal the RLC PDU SN value plus 1 (i.e., VR(UH)=SN+1). Thereafter, among the PDUs stored in the reception buffer, those RLC PDUs having SN values that are outside the updated receive window (namely, those RLC PDUs having SN values not within the range from "VR(UH)-receive window size" to "VR(UH)") are reserved for reassembly (reconstruction) and as a result, if the VR(UR) is lower than the updated receive window, the VR(UR) is updated to "VR(UH)-receive window size".

In the above procedures, processing the RLC PDU according to whether or not a RLC PDU having SN=VR(UR) exists, means that if a RLC PDU having a particular SN value exists within the receive window, the RLC PDUs beginning from and including the above RLC PDU up to the first RLC PDU that was not received in sequence are reserved for reassembly, and the VR(UR) value is updated to the SN value of the first RLC PDU that was not received in sequence.

In the above procedures, processing by using the reordering timer means that if a reordering timer that is operating (running) exists, then the UM RLC checks whether a RLC PDU having SN=VR(UT) had been reserved for reassembly, and if so, the reordering timer is stopped. Then the UM RLC re-checks to see if there is a reordering timer that is operating (running), and if not, checks to see if there are any RLC PDUs existing in the reception buffer but that have not been reserved, and if so, the reordering timer is operated again (i.e., the reordering timer is re-started) for that RLC PDU having the highest SN among those RLC PDUs existing in the reception buffer but that have not been reserved, and the VR(UT) is updated to equal the SN value of that RLC PDU having the highest SN.

In the above procedures, processing the RLC PDUs that had reassembly reserved thereto, refers to discarding the RLC SDUs related to the RLC PDUs that were not received, and the RLC SDUs are reassembled based upon the received RLC PDUs and then delivered to an upper layer. Here, the RLC SDU related to the RLC PDU refers to the RLC SDU having a portion of its data or having a length indicator indicating the end of the RLC SDU being included within the RLC PDU.

Also in the above procedures, whenever the reordering timer expires, the UM RLC reserves for reassembly those RLC PDUs having SN values greater than VR(UR) but less than VR(UT), reserves for reassembly those RLC PDUs beginning from the RLC PDU having SN=VR(UT) up to the first RLC PDU that was not received in sequence, and updates the SN value of the first RLC PDU that was not received in sequence to equal VR(UR). As a result of these steps, if there are any RLC PDUs within the reception buffer but have not been reserved for reassembly, the reordering timer is re-started for the RLC PDU having the highest SN among those RLC PDUs, and the SN value of the RLC PDU (having the highest SN) is updated to equal VR(UT).

Figure 5A:
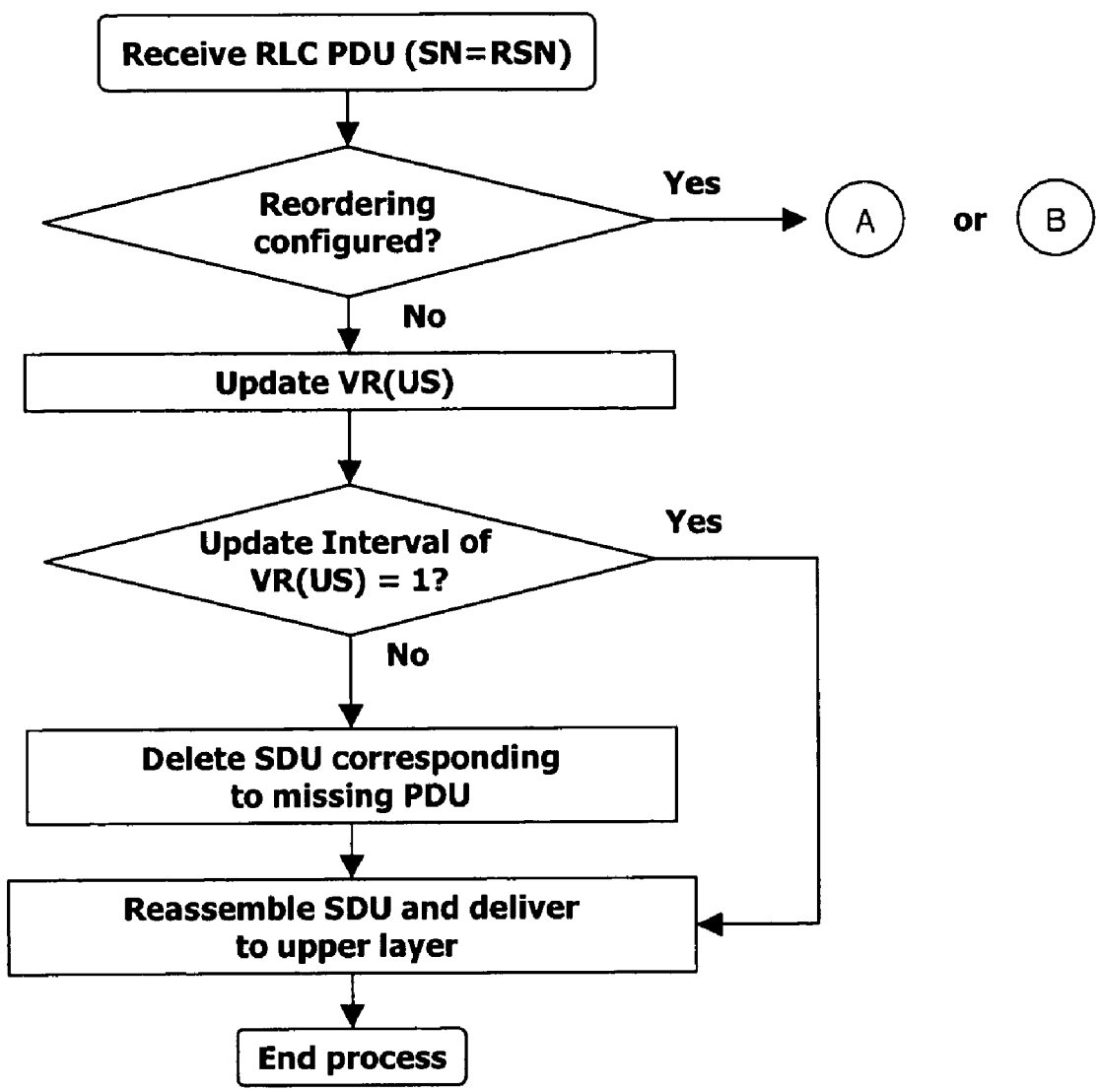
FIG. 5A depicts a data processing method of the UM RLC according to a first and second embodiment of the present invention.
Figure 5B:
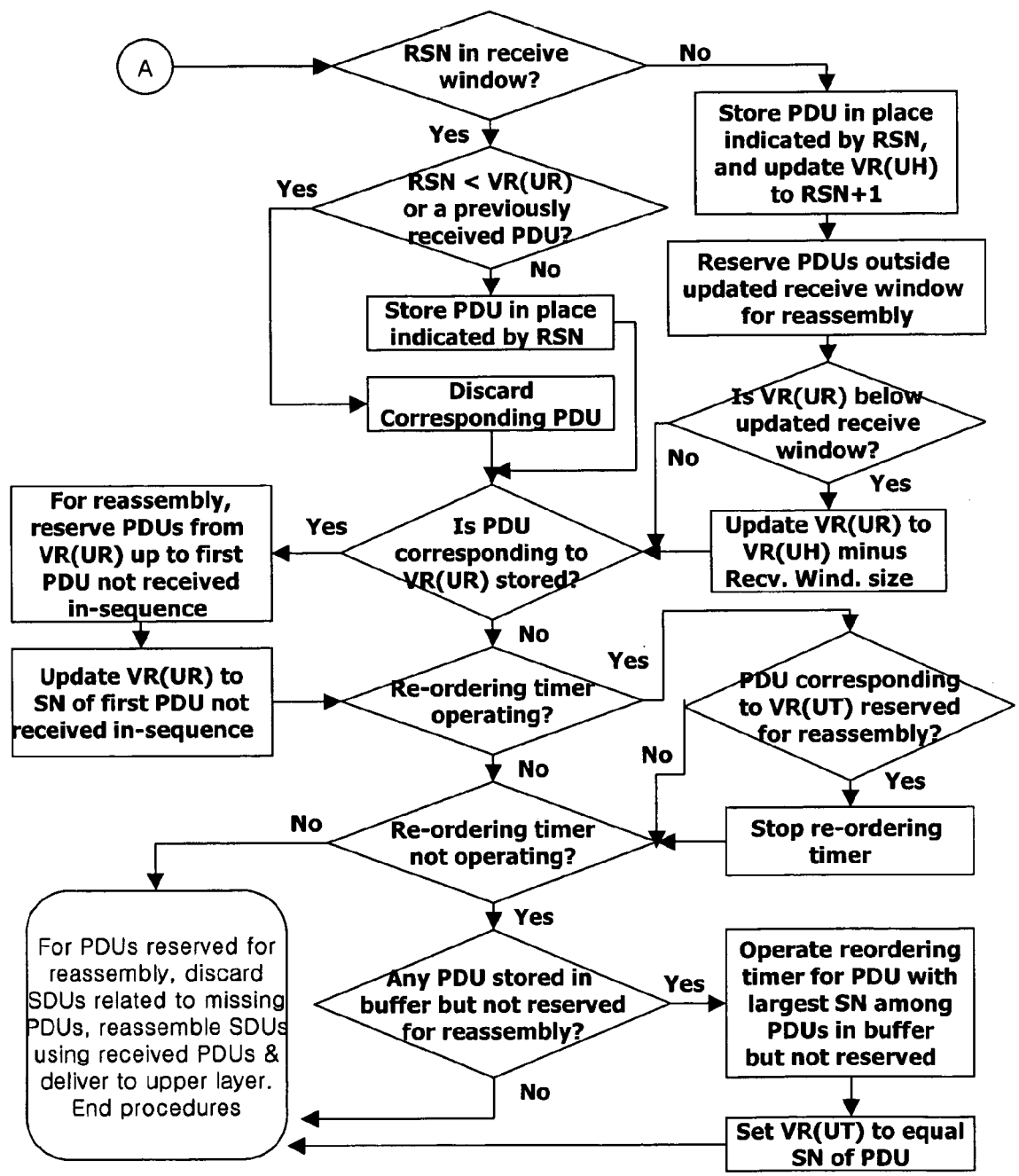
FIG. 5B depicts a data processing method of the UM RLC according to a first embodiment of the present invention.

FIGS. 5A and 5B depict the operation of the UM RLC of the receiving end (e.g., terminal, UE, etc.) according to a first embodiment of the present invention.

In step 1, a RLC PDU having a SN value of RSN arrives at the UM RLC from a lower layer.

In step 2, if reordering has been configured, the process goes to subsequent step 5, if not, the next step 3 is performed.

In step 3, VR(US) is updated and if the VR(US) update interval is not 1, the PDUs considered to be lost (missing) and the SDUs associated therewith are discarded. Here, the RLC PDUs considered to be lost (missing) are those RLC PDUs having sequence numbers that are greater than or equal to the VR(US) before updating and less than the RSN.

In step 4, by using the received RLC PDUs, the RLC SDUs are reassembled and after delivering such to an upper layer, the procedures are completed.

In step 5, if the RSN is not within the receive window, the process goes to step 7, and if the RSN is in the receive window, the next step is performed.

In step 6, if the RSN is lower than VR(UR) or if the received RLC PDU is a PDU that had been previously received, the corresponding RLC PDU is discarded, and if not, the RLC PDU is stored in the reception buffer at the location indicated by the RSN. Thereafter, the process goes to step 10.

In step 7, the received RLC PDU is put in the location indicated by the RSN, and VR(UH) is updated to equal RSN+1.

In step 8, the RLC PDUs having SN values lower than the updated window, namely, SN values located outside the receive window, are reserved for reassembly.

In step 9, if the VR(UR) is located below the updated window, the VR(UR) is updated to a value equaling VR(UH)-receive window size.

In step 10, if the RLC PDU corresponding to the VR(UR) is not stored in the reception buffer, the process goes to step 12, otherwise, the next step is performed.

In step 11, in the reception buffer, the RLC PDUs beginning from the RLC PDU having VR(UR) up to the first RLC PDU that had not been sequentially received, are reserved for reassembly. Then, the VR(UR) is updated to equal the SN value of the first RLC PDU that had not been sequentially received.

In step 12, if the reordering timer is not operating (running), the process goes to step 14, otherwise the next step is performed.

In step 13, if a RLC PDU corresponding to the VR(UT) has been reserved for reassembly, then the reordering timer is stopped.

In step 14, if the reordering timer is operating (running), the process goes to step 17, otherwise, the next step is performed.

In step 15, if there are RLC PDUs that are stored in the reception buffer but have not been reserved for reassembly, the next step is performed, otherwise, the process goes to step 17.

In step 16, among the RLC PDUs that are stored in the reception buffer but have not been reserved for reassembly, the reordering timer is operated for the RLC PDU having the highest SN value, and VR(UT) is set as the SN value of the PDU (having the highest SN value).

In step 17, for the RLC PDUs for which reordering had been reserved, the RLC SDUs related to the RLC PDUs considered to be lost (missing) are discarded, and for the received RLC PDUs, the RLC SDUs are restored and delivered to the upper layer, to thus end the procedures.

Hereafter, the second embodiment according to the present invention will be described. The second embodiment is an improvement of the first embodiment by using the characteristics of the UM RLC. Namely, even if the UM RLC of the receiving end (e.g., terminal, UE, etc.) receives RLC PDUs from multiple cells or multiple logical channels, the transmitting end of each cell or of each logical channel respectively does not re-transmit the RLC PDU and by using the fact that those RLC PDUs having an SN value that is lower than the SN of any previously transmitted RLC PDU are not re-transmitted, the effect of preventing delays in delivery to the upper layer due to RLC PDUs remaining within the receive window for an unnecessary amount of time can be obtained.

In more detail, the UM RLC records (stores) the SN value of the RLC PDU lastly received from each logical channel, and uses the minimum value among the SN values of the RLC PDUs lastly received from each logical channel. Here, by using the fact that a RLC PDU having a SN value that is lower than the above minimum value cannot be further received from any logical channel, if the UM RLC is waiting (expecting) to receive a RLC PDU having a SN that is lower than the above minimum value, the terminal reserves for immediate reassembly those RLC PDUs beginning with the RLC PDU that is expected up to the RC PDU corresponding to the above minimum value, to thus prevent delivery delays that may occur due to any unnecessary waiting by the UM RLC for expected reception of RLC PDUs that are no longer to be transmitted. To achieve this, the second embodiment additionally defines state variables to propose a more rapid and effective method compared to the first embodiment.

The second embodiment additionally defines the following variable in addition to those in the first embodiment.

VR(US_i): next expected reception number of i-th channel—this is used when reordering has been configured, and refers to the next value after the SN value of the RLC PDU received last from the i-th logical channel.

The detailed operation method of the second embodiment will be explained hereafter.

When the UM RLC of the receiving end (e.g., terminal, UE, etc.) receives a new RLC PDU from a lower layer, it operates according to whether reordering had been configured or not, whereby the UM RLC operates as in the related art if reordering had not been configured, while the UM RLC operates according to the SN value of the received RLC PDU, the receive window, and the timer if reordering had been configured.

The UM RLC operating as in the related art refers to the procedures of updating the VR(US) according to the SN value of the received RLC PDU, considering that there is at least one lost (missing) PDU if the VR(US) update interval is not 1, discarding those RLC SDUs related to the RLC PDUs that were considered to be missing, reassembling only those RLC SDUs considered to be successfully received and delivering such to an upper layer. If the VR(US) update interval is 1, it is considered that there are no lost (missing) PDUs, and the RLC SDUs are reassembled based upon the received RLC PDUs and delivered to the upper layer. Here, the RLC SDU related to the RLC PDU refers to the RLC SDU having a portion of its data or having a length indicator indicating the end of the RLC SDU being included within the RLC PDU.

The UM RLC operating according to the SN value of the received RLC PDU, the receive window, and the timer refers to checking the newly received RLC PDU by using the RLC PDU SN value, the receive window, and the VR(UR), processing the corresponding RLC PDUs according to the checking result, additionally processing of the RLC PDUs by using the minimum value of the next expected reception number (i.e., VR(US_i)) of each logical channel, and then additional processing by using a reordering timer, and additionally processing those RLC PDUs for which reassembly had been reserved.

In the above procedure, the checking of the newly received RLC PDU by using the RLC PDU SN value, the receive window, and the VR(UR), and then processing the corresponding RLC PDUs according to the checking result will be explained in more detail hereafter. First, if the received RLC PDU was delivered through the i-th logical channel, the state variable (VR(US_i)) corresponding to that logical channel is updated to equal 1 plus the SN value of the received RLC PDU. Thereafter, it is checked to see if the SN value of the received RLC PDU is located within the receive window. If so, the RLC PDU is discarded if the SN value is lower than VR(UR) or if the RLC PDU corresponding to the above SN value had already been received. Otherwise, the RLC PDU is stored in the reception buffer at the location indicated by the SN value. If the SN value is not within the receive window, the received RLC PDU is stored in the location indicated by the SN value and the location of the receive window is updated by setting the VR(UH) value to equal the RLC PDU SN value plus 1 (i.e., VR(UH)=SN+1). Thereafter, among the PDUs stored in the reception buffer, those RLC PDUs having SN values that are outside the updated receive window (namely, those RLC PDUs having SN values not within the range from "VR(UH)-receive window size" to "VR(UH)") are reserved for reassembly and as a result, if the VR(UR) is lower than the updated receive window, the VR(UR) is updated to "VR(UH)-receive window size".

In the above procedure, processing of the RLC PDUs by using the minimum value of the next expected reception number (i.e., VR(US_i)) of each logical channel, means that the minimum of the VR(US_i) values is obtained for all logical channels connected with the UM RLC, and if this minimum value is greater than VR(UR), the corresponding received RLC PDUs having an SN that is greater than VR(UR) and less than the minimum of VR(US_i) are reserved for reassembly, and the VR(UR) is reset to equal VR(US_i). Here, 'i' is a value between 0 and N−1, where 'N' is the total number of logical channels connected with the UM RLC, and VR(US_i) is the next expected reception number of i-th channel (as described above).

In the above procedures, processing the RLC PDU according to whether or not a RLC PDU having SN=VR(UR) exists, means that if a RLC PDU having a particular SN value exists within the receive window, the RLC PDUs beginning from and including the above RLC PDU up to the first RLC PDU that was not received in sequence are reserved for reassembly, and the VR(UR) value is updated to the SN value of the first RLC PDU that was not received in sequence.

In the above procedures, processing by using the reordering timer means that if a reordering timer that is operating (running) exists, then the UM RLC checks whether a RLC PDU having SN=VR(UT) had been reserved for reassembly, and if so, the reordering timer is stopped. Then the UM RLC re-checks to see if there is a reordering timer that is operating (running), and if not, checks to see if there are any RLC PDUs existing in the reception buffer but that have not been reserved, and if so, the reordering timer is operated again (i.e., the reordering timer is re-started) for that RLC PDU having the highest SN among those RLC PDUs existing in the reception buffer but that have not been reserved, and the VR(UT) is updated to equal the SN value of that RLC PDU having the highest SN.

In the above procedures, processing the RLC PDUs that had reassembly reserved thereto, refers to discarding the RLC SDUs related to the RLC PDUs that were not received, and the RLC SDUs are reassembled based upon the received RLC PDUs and then delivered to an upper layer. Here, the RLC SDU related to the RLC PDU refers to the RLC SDU having a portion of its data or having a length indicator indicating the end of the RLC SDU being included within the RLC PDU.

Also in the above procedures, whenever the reordering timer expires, the UM RLC reserves for reassembly those RLC PDUs having SN values greater than VR(UR) but less than VR(UT), reserves for reassembly those RLC PDUs beginning from the RLC PDU having SN=VR(UT) up to the first RLC PDU that was not received in sequence, and updates the SN value of the first RLC PDU that was not received in sequence to equal VR(UR). As a result of these steps, if there are any RLC PDUs within the reception buffer but have not been reserved for reassembly, the reordering timer is re-started for the RLC PDU having the highest SN among those RLC PDUs, and the SN value of the RLC PDU (having the highest SN) is updated to equal VR(UT).

Figure 5C:
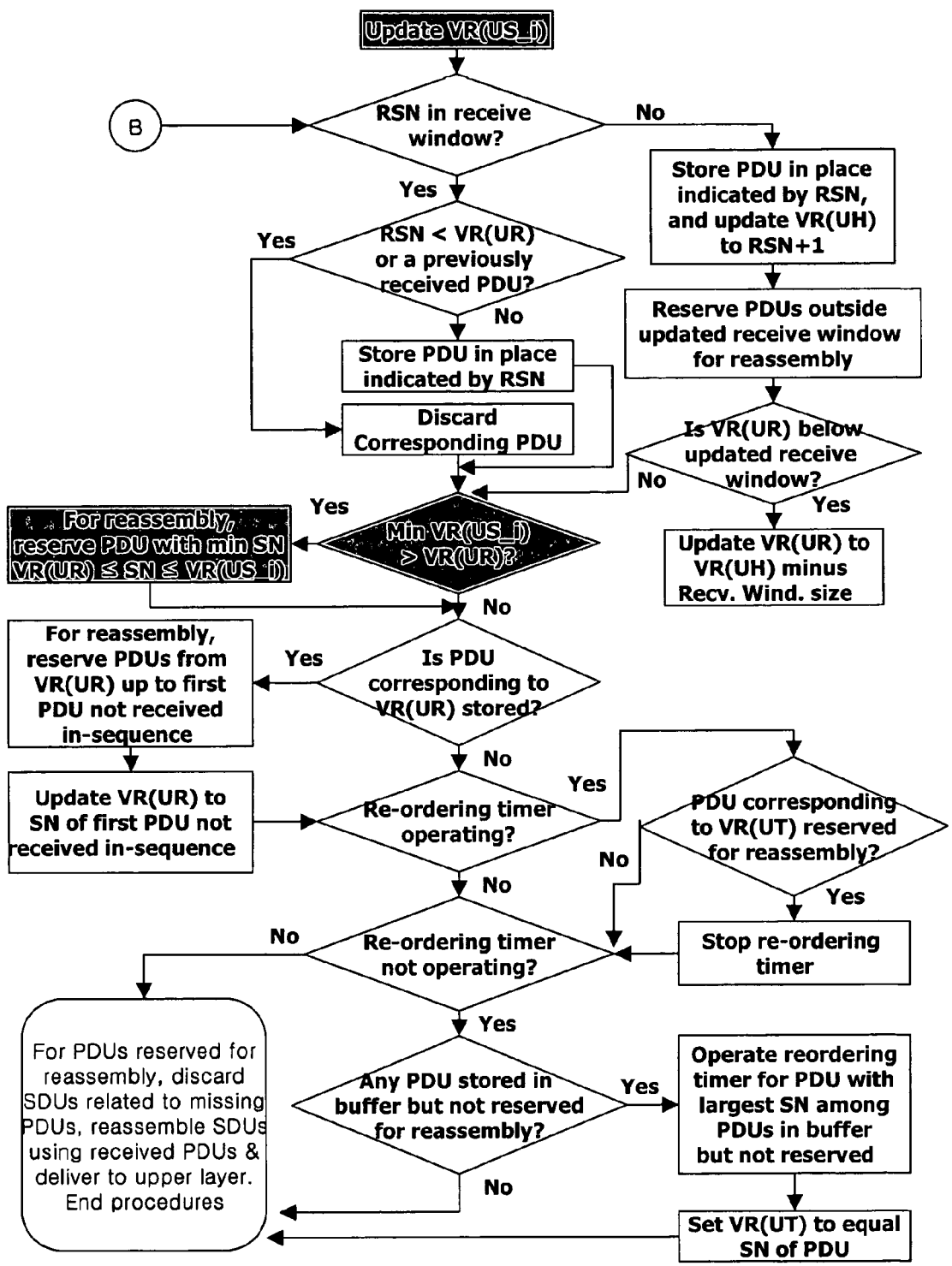
FIG. 5C depicts a data processing method of the UM RLC according to a second embodiment of the present invention.

FIGS. 5A and 5C depict the operation of the UM RLC of the receiving end (e.g., terminal, UE, etc.) according to a second embodiment of the present invention. The procedures of FIG. 5C are similar to those of FIG. 5B, and the additional steps not employed in FIG. 5B are indicated as shaded portions in FIG. 5C.

In step 1, a RLC PDU having a SN value of RSN arrives at the UM RLC from a lower layer through the i-th logical channel.

In step 2, if reordering has been configured, the process goes to subsequent step 5, if not, the next step 3 is performed.

In step 3, VR(US) is updated and if the VR(US) update interval is not 1, the PDUs considered to be lost (missing) and the SDUs associated therewith are discarded. Here, the RLC PDUs considered to be lost (missing) are those RLC PDUs having sequence numbers that are greater than or equal to the VR(US) before updating and less than the RSN.

In step 4, by using the received RLC PDUs, the RLC SDUs are reassembled and after delivering such to an upper layer, the procedures are completed.

In step 5, the VR(US_i) corresponding to the i-th logical channel is updated to equal RSN+1, and if the RSN is not within the receive window, the process goes to step 7, and if the RSN is in the receive window, the next step is performed.

In step 6, if the RSN is lower than VR(UR) or if the received RLC PDU is a PDU that had been previously received, the corresponding RLC PDU is discarded, and if not, the RLC PDU is stored in the reception buffer at the location indicated by the RSN. Thereafter, the process goes to step 10.

In step 7, the received RLC PDU is put in the location indicated by the RSN, and VR(UH) is updated to equal RSN+1.

In step 8, the RLC PDUs having SN values lower than the updated window, namely, SN values located outside the receive window are reserved for reassembly.

In step 9, if the VR(UR) is located below the updated window, the VR(UR) is updated to a value equaling VR(UH)-receive window size.

In step 10, the minimum value of the VR(US_k) values for all logical channels is obtained. Here, 'k' is a value between 0 and N, and 'N' being the total number of logical channels. If the minimum VR(US_k) is greater than VR(UR), the RLC PDUs having SN values from VR(UR) up to VR(US_k) are reserved for reassembly, and VR(UR) is updated to equal the minimum VR(US_k). Thereafter, if the RLC PDU corresponding to the VR(UR) is not stored in the reception buffer, the process goes to step 12, otherwise, the next step is performed.

In step 11, in the reception buffer, the RLC PDUs beginning from the RLC PDU having VR(UR) up to the first RLC PDU that had not been sequentially received, are reserved for reassembly. Then, the VR(UR) is updated to equal the SN value of the first RLC PDU that had not been sequentially received.

In step 12, if the reordering timer is not operating (running), the process goes to step 14, otherwise the next step is performed.

In step 13, if a RLC PDU corresponding to the VR(UT) has been reserved for reassembly, then the reordering timer is stopped.

In step 14, if the reordering timer is operating (running), the process goes to step 17, otherwise, the next step is performed.

In step 15, if there are RLC PDUs that are stored in the reception buffer but have not been reserved for reassembly, the next step is performed, otherwise, the process goes to step 17.

In step 16, among the RLC PDUs that are stored in the reception buffer but have not been reserved for reassembly, the reordering timer is operated for the RLC PDU having the highest SN value, and VR(UT) is set as the SN value of the PDU (having the highest SN value).

In step 17, for the RLC PDUs for which reordering had been reserved, the RLC SDUs related to the RLC PDUs considered to be missing are discarded, and for the received RLC PDUs, the RLC SDUs are restored and delivered to the upper layer, to thus end the procedures.

However, in the second embodiment of the present invention described above, assuming that the transmitting end (e.g., UTRAN) does not perform re-transmissions, is an improvement over the first embodiment. On the other hand, if the transmitting end performs re-transmissions, the second embodiment may not operate as desired and the first embodiment may need to be used. Thus, in the present invention, in order to allow the receiving side to operate by having the UM RLC consider whether re-transmissions are performed at the transmitting side, the UM RLC can operate according to the first embodiment when re-transmission has been set at an upper layer and operate according to the second embodiment when re-transmission has not been set. To achieve this, the UM RLC at the receiving end can receive a re-transmission indication and can then selectively use the first embodiment method or the second embodiment method accordingly.

As described above, the present invention advantageously allows the UM RLC entity receiving RLC PDUs delivered through one or more logical channels, to operate with minimal delivery delay time, minimal loss of PDUs received from each logical channel, and processing the PDUs with any duplicate operations.

The present invention can employ a variety of software, hardware, and/or a combination thereof to achieve the above-identified procedures and steps for UM RLC data handling, examples of which are explained hereafter.

Figure 6A:
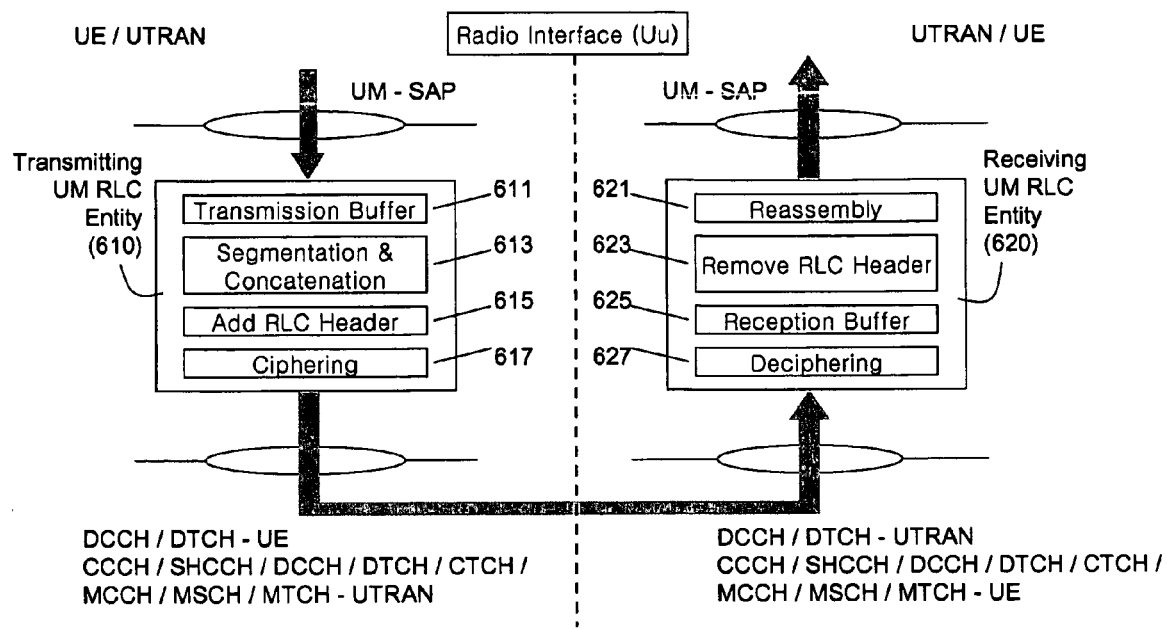
FIGS. 6A and 6B depict UM RLC peer entities in the UTRAN and terminal (UE) according to the present invention.
Figure 6B:
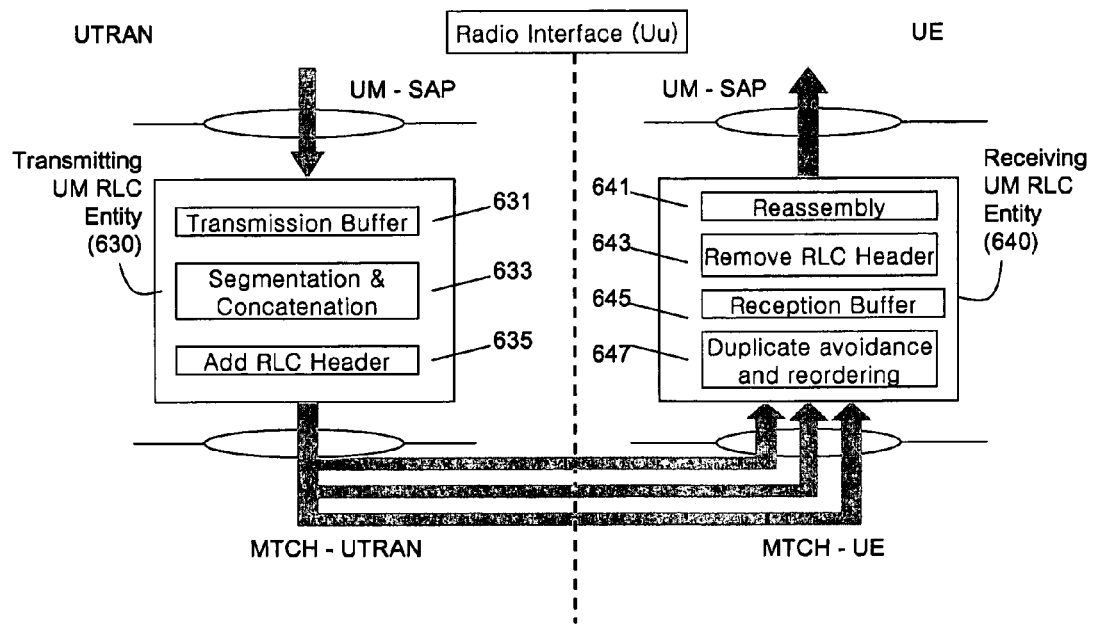

FIG. 6A and FIG. 6B respectively depict a model of two unacknowledged mode (UM) peer entities for a transmitting end (e.g., UTRAN) and a receiving end (e.g., UE) according to the present invention. FIG. 6A shows two UM peer RLC entities when duplicate avoidance and reordering are not configured, while FIG. 6B shows two UM peer RLC entities configured for duplicate avoidance and reordering. In FIG. 6B, duplicate avoidance and reordering are only specified for MTCH (MBMS point-to-multipoint Traffic CHannel), the ciphering and deciphering portions are omitted. Referring to both FIGS. 6A and 6B, the transmitting UM RLC entity and the receiving UM RLC entity will be explained.

The transmitting UM RLC entity receives RLC SDUs from upper layers through the UM-SAP. The transmitting UM RLC entity segments the RLC SDU into RLC PDUs (e.g., Unacknowledged Mode Data (UMD) PDUs) of appropriate size if the RLC PSDU is higher then the length of available space in the UMD PDU. The UMD PDU may contain segmented and/or concatenated RLC SDUs. The UMD PDU may also contain padding to ensure that it is of a valid length. Length indicators (LI) are used to define boundaries between RLC SDUs within the UMD PDUs. The length indicators are also used to define whether padding is included in the UMD PDU. If ciphering is configured and started, a UMD PDU is ciphered (except for the UMD PDU header) before it is submitted to the lower layer. The transmitting UM RLC entity submits the UMD PDUs to the lower layer through either a CCCH, SHCCH, DCCH, CTCH, DTCH, MCCH, MSCH or MTCH logical channel.

The receiving UM RLC entity receives the UMD PDUs through the configured logical channels from the lower layer. When 'duplicate avoidance and reordering' is configured, there may be one or more inputs from the lower layer. Inputs can be added or removed without changing the buffer contents, state variables or timers within the receiving UM RLC entity. Where 'duplicate avoidance and reordering' is not configured, there is only one input from the lower layer and it is not reconfigured. When configured, 'duplicate avoidance and reordering' is the first receive function that is applied to the input UMD PDU streams in the receiving UM RLC entity, and can be configured preferably only in a UE, and preferably not used in the UTRAN. The 'duplicate avoidance and reordering' completes duplicate detection and reordering of the UMD PDUs that are received from the one or more inputs to produce a single ordered sequence of PDUs that are passed to the next in-sequence RLC receiver function. The receiving UM RLC entity deciphers (if ciphering is configured and started) the received UMD PDUs (except for the UMD PDU header). Then, the RLC headers are removed from the UMD PDUs and the RLC SDUs are reassembled (if segmentation and/or concatenation has been performing by the transmitting UM RLC entity). Finally, the RLC SDUs are delivered by the receiving UM RLC entity to the upper layers through the UM-SAP.

Thus, it can be said that the present invention extends the UM RLC receiver functionality to include a 'duplicate avoidance and reordering' (DAR) function. This DAR function can be configured in the UE and advantageously used for reception of a particular logical channel, namely, the MBMS MTCH.

The DAR function can be configured for use within a receiving UM RLC entity in the UE. It combines PDU sequences received from several sources and/or repeat transmissions from a single source to form a single ordered PDU sequence that is passed to the header removal and reassembly functions. It completes duplicate detection, discard and reordering based on the UM PDU sequence number. Where the UM RLC receives input from several sources, inputs can be added or removed without changing the buffer contents, state variables and timers associated with the DAR function or any subsequent UM RLC function.

The DAR function makes use of the state variable VR(UDR) and a receive window whose span (range) if from VR(UDH)-DAR_Window_Size+1 to VR(UDH) inclusively. For reordering, the DAR function uses a buffer for the temporary storage of PDUs. For each PDU received, the DAR function shall perform the procedures of (1) setting initial values of state variables, (2) duplicate detection and reordering, and (3) timer operation.

In procedure (1),
(a) if the PDU if the first PDU received by the DAR function,
VR(UDH) is assigned the value SN;
VR(UDR) is assigned the value VR(UDH)-DAR_Window_Size+1.

In procedure (2),
(a) if SN is within the receive window,
if SN<VR(UDR) or if a PDU with SN is already stored in the buffer, the PDU shall be discarded,
otherwise, the PDU shall be stored in the buffer.
(b) if SN is outside of the receive window,
the PDU shall be stored in the buffer;
VR(UDH) shall be assigned the value SN, thereby advancing the receive window;
for any stored PDUs with sequence numbers<VR(UDH)-DAR_Window_Size+1, remove the PDU from the buffer and deliver them to the higher RLC function; and
if VR(UDR)<VR(UDH)-DAR_Window_Size+1, VR(UDR) shall be assigned the value VR(UDH)-DAR_Window_size+1.
(c) if the PDU with sequence number VR(UDR) is stored in the buffer,
or this PDU and any sequence of stored PDUs with consecutive index(sequence) numbers starting at VR(UDR)+1, remove the PDUs from the buffer and deliver them to the higher RLC function,
VR(UDR) shall be assigned the value of x+1 where x is the SN of the highest numbered PDU that was delivered to the higher RLC function.

In procedure (3),
(a) if Timer_DAR is not active when a PDU is stored by the DAR function;
Timer_DAR shall be started;
VR(UDT) shall be assigned the value of the SN of the PDU.
(b) Timer_DAR shall be stopped;
if the PDU with sequence number VR(UDT) is removed from the buffer before Timer_DAR expires.
(c) if Timer_DAR expires;
for all stored PDUs with sequence numbers lowe or equal to VR(UDT) and for any sequence of stored PDUs with consecutive sequence numbers starting at VR(UDT)+1, remove the PDUs from the buffer and deliver them to higher RLC function;
VR(UDR) shall be assigned the value x+1 where x is the sequence number of the highest numbered PDU that was delivered to the higher RLC function.
(d) when Timer_DAR is stopped or expires, and there remain PDUs stored by the DAR function,
Timer_DAR shall be started;
VR(UDT) shall be assigned the sequence number of the highest numbered stored PDU.

Figure 7:
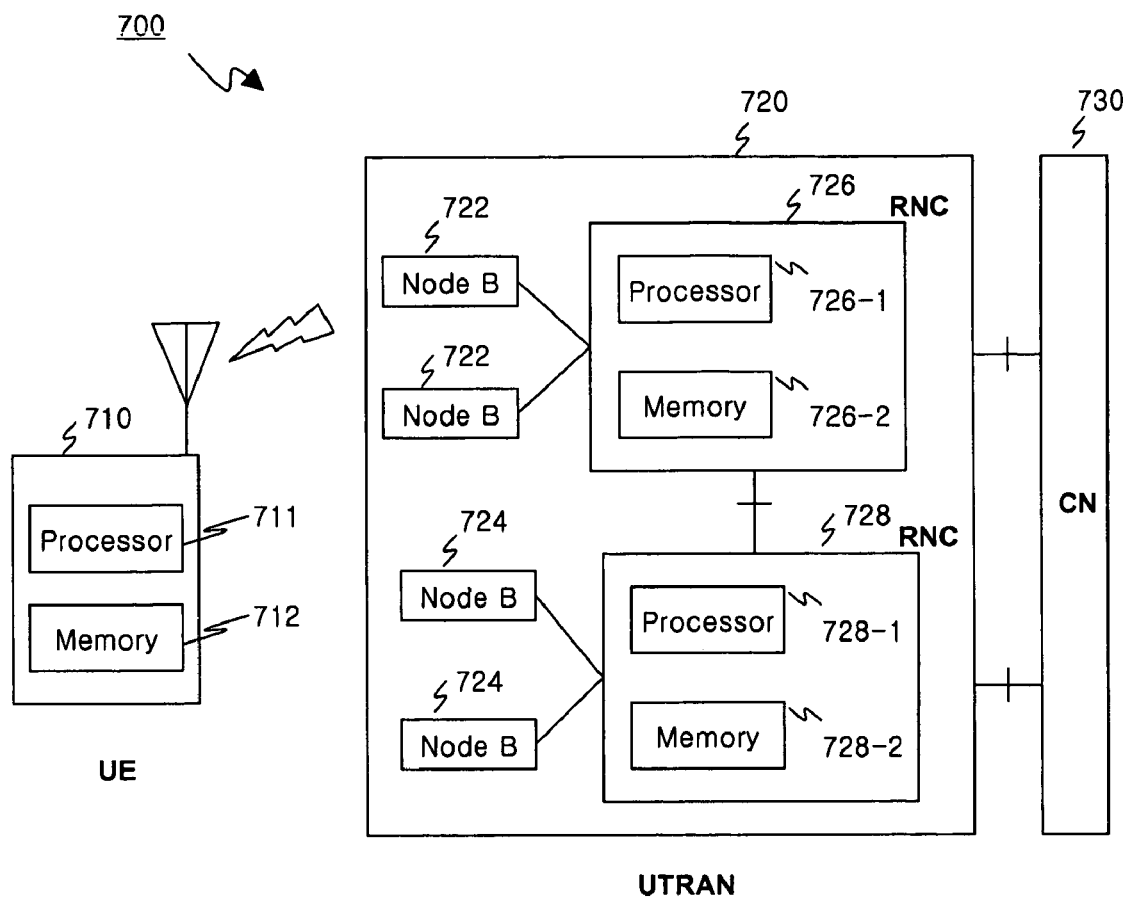
FIG. 7 depicts an exemplary communications system according to the present invention.

FIG. 7 depicts a communication system comprising a terminal (UE 710) in radio communication with a network (UTRAN 720 and CN 730) according to the present invention. The network (UTRAN 720 and CN 730) may include various hardware and software components. For example, the UTRAN 720 comprises an RNC (726), being connected to a plurality of Node Bs (722), and having a processor (726-1) and a memory (726-2). An RNC (728), being connected to a plurality of Node Bs (724), may also comprise a processor (728-1) and a memory (728-2). The RNCs (726, 728) are connected with one another via an interface, and connected with the CN (730) via another interface. The network (UTRAN 720 and CN 730) handles the various processing procedures for communications with the terminal (UE 710) as described previously. Here, it should be noted that various software codes and protocols that are required for achieving the present invention may be stored in one or more memory devices and executed by one or more processors located within the Node Bs (722, 724), the RNCs (726, 728), and/or other network elements.

Figure 8:
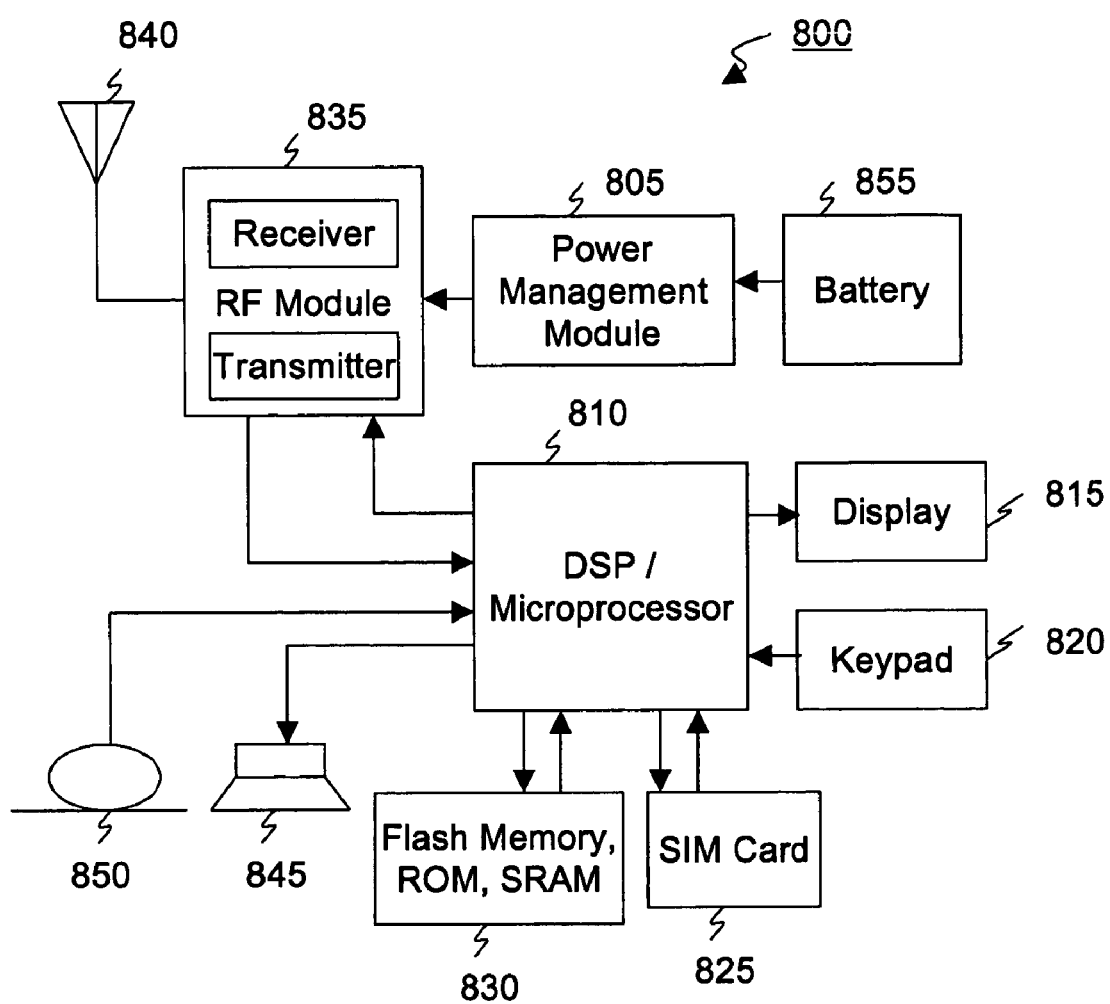
FIG. 8 depicts a structure of a terminal (UE) according to the present invention.

FIG. 8 depicts the structure of a terminal (UE 800) according to the present invention. The terminal (UE 800) may include various hardware and software components. For example, there are processing circuits and memory devices, such as, a DSP/Microprocessor (810), a Flash memory, ROM, SRAM (830), and a SIM card (825). Here, the memory (830) can store software codes for implementing the present invention and a processor (810) that can execute these software codes. Also, there is a transceiver section (transceiver) including a battery (855), a power management module (805), a RF module (835) having a receiver and a transmitter, and an antenna (840). Additionally, there are input and output components, such as a display (815), a keypad (820), a speaker (845), and a microphone (850). The terminal (UE 800) handles various signal processing procedures for communication with the network, for example, the network in FIG. 7. Here, it should be noted that various software codes and protocols that are required for achieving the present invention may be stored in one or more memory devices and executed by one or more processors within the terminal (UE 800).

The present invention provides a method of handling data units for a point-to-multipoint service in a mobile communication system, the method comprising: receiving protocol data units by a radio link control entity that operates in unacknowledged mode and has a receive window and a timer; re-ordering the received protocol data units using sequence numbers of the received protocol data units, the receive window, and the timer; processing the re-ordered protocol data units to reassemble at least one service data unit; and delivering the at least one service data unit.

The above method further comprising a step of deciding whether to perform the re-ordering step in accordance with an indication received from an upper layer. Here, using the receive window refers to managing a range of the sequence numbers of the protocol data units that can be expected to be received based upon a received protocol data unit, wherein the receive window is used in temporarily storing protocol data units in a buffer to allow non-sequential protocol data units to be received and re-ordered for in-sequence delivery, and wherein the receive window is updated after processing the re-ordered protocol data units.

Here, using the timer refers to operating a reordering timer for those received protocol data units that remain in the receive window without having been reserved for reassembly, such that these protocol data units are processed after the lapse of a certain amount of time regardless of whether certain other protocol data units are received or not. Namely, the timer is used to limit a duration during which protocol data units are received and temporarily stored in a buffer for re-ordering.

Here, the service is a multimedia broadcast multicast service with protocol data units being received from multiple cells or from multiple channels, wherein the radio link control entity handles the protocol data units received through at least one logical channel, and the above method further comprising a step of discarding a newly received protocol data unit if the newly received protocol data unit has the same sequence number as that of another protocol data unit that was previously received.

The present invention also provides a method to handle data units of a point-to-multipoint service for mobile communications, the method comprising: receiving an indicator from a network; establishing a receive window by setting its upper edge to equal a sequence number of a first protocol data unit to be received; receiving one or more protocol data units; determining whether each received protocol data unit is within the receive window or not; if within the receive window, placing the received protocol data unit in a buffer at a location indicated by the sequence number or discarding the received protocol data unit if that protocol data unit had been previously received; and processing the received protocol data unit if its sequence number is a next expected sequence number subsequent to a last protocol data unit received in sequence; if not, waiting for a protocol data unit having a sequence number that equals the next expected sequence number; and if not within the receive window, storing the received protocol data unit into a buffer, and the receive window is advanced if necessary.

Here, the indicator indicates whether to perform re-ordering of protocol data units to be received, wherein the service is a multimedia broadcast multicast service with protocol data units being received from multiple cells or from multiple channels, and wherein a timer is used to limit a duration during which protocol data units are received and temporarily stored in a buffer for re-ordering.

The present invention further provides a radio link control entity operating in unacknowledged mode and handling data units for a point-to-multipoint service, the entity comprising: a duplicate avoidance and reordering element to receive and reorder protocol data units from one or more logical channels or from one or more cell regions to ensure that the protocol data units are processed for in-sequence delivery.

This entity further comprises: a reception buffer element to store the protocol data units received by the duplicate avoidance and reordering element; a radio link control header removing element to remove a header of the received protocol data units; and a reassembly element to reassemble the received protocol data units based upon their sequence numbers in order to form one or more service data units, and to deliver the service data units to an upper layer.

Here, the data units are received via a point-to-multipoint service traffic channel. Also, this entity further comprises: a deciphering element to receive the protocol data units prior to the duplicate avoidance and reordering element to perform deciphering thereon, if the protocol data units were received via a channel other than a point-to-multipoint service traffic channel.

Furthermore, the present invention provides a method for handling data units of a point-to-multipoint service in a radio link control entity, the method comprising: performing duplicate detection and reordering based upon sequence numbers of protocol data units that are received from a single source with repeat transmissions or from multiple sources and temporarily stored in a buffer; performing a timer operation to control a duration during which the protocol data units are stored in the buffer; and delivering, based upon the timer operation, to a higher radio link control function, all consecutive protocol data units stored in the buffer and discarding missing protocol data units to allow service data units to be reassembled from the delivered protocol data units.

Here, the duplicate detection and reordering step further comprises: checking whether a sequence number of the protocol data unit is within a receive window; if so, the protocol data unit is either discarded or stored in the buffer; and if not, the protocol data unit is stored in the buffer and the receive window is updated if necessary.

Although various aspects, embodiments, and features of the present invention have been described for a UMTS communications scheme, many of these techniques can be advantageously applied for other communications methods and systems.

The foregoing description of the preferred embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but us to be accorded the widest scope consistent with the principles and novel features disclosed herein.

What is claimed is:

1. A mobile terminal, comprising:
a first radio link control (RLC) entity and a second RLC entity which both operate in unacknowledged mode (UM) and handle data units, wherein the first RLC entity and the second RLC entity are located between a medium access (MAC) layer and an upper layer, wherein
the first RLC entity is used when a reordering is not configured, the first RLC entity comprising:
a deciphering element to receive protocol data units (PDUs) for performing a deciphering when the protocol data units (PDUs) are received via a channel other than a multimedia broadcast/multicast service (MBMS) traffic channel (MTCH);
a reception buffer element to store the protocol data units (PDUs) received by the deciphering element;
a RLC header removing element to remove headers of the received protocol data units (PDUs); and
a reassembly element to reassemble the received protocol data units (PDUs) based upon their sequence numbers in order to form one or more service data units, and to deliver the service data units to the upper layer; and wherein
the second RLC entity is used when the reordering is configured, the second RLC entity comprising:
a reordering element to receive and reorder protocol data units (PDUs) from one or more logical channels or from one or more cell regions to ensure that the protocol data units (PDUs) are processed for in-sequence delivery, wherein the protocol data units (PDUs) are received via the multimedia broadcast/multicast service (MBMS) traffic channel (MTCH) which is configured for a point-to-multipoint service,
wherein the reordering element is a first receive function in the second RLC entity, the second RLC entity not performing acknowledgement of the PDUs,
wherein the reordering of the reordering element is only specified for the MTCH,
wherein a first variable and a second variable are used for the reordering element,
wherein the first variable is related to a sequence number (SN) of a next protocol data unit (PDU) that is expected to be received and the second variable is related to a highest sequence number (SN) among all sequence numbers of the received protocol data units (PDUs),
wherein the first variable and the second variable are used when the reordering element has been configured in the second RLC entity operating in the unacknowledged mode (UM);
wherein the second variable is also related to an upper limit value of a receive window;
a reception buffer element to store the protocol data units (PDUs) received by the reordering element;
a RLC header removing element to remove headers of the received protocol data units (PDUs); and
a reassembly element to reassemble the received protocol data units (PDUs) based upon their sequence numbers in order to form one or more service data units, and to deliver the service data units to the upper layer.

2. The mobile terminal as claimed in claim 1, wherein the reordering element uses the sequence numbers of the received protocol data units (PDUs), the receive window, and a timer.

3. The mobile terminal as claimed in claim 1, wherein the reordering element is configured by an indication received from the upper layer.

4. The mobile terminal as claimed in claim 1, wherein the reordering element is configured by an identifier that indicates whether to perform re-ordering of protocol data units to be received.

5. The mobile terminal as claimed in claim 1, wherein the second variable is a next value of the highest sequence number (SN).

6. The mobile terminal as claimed in claim 1, wherein a third variable is also used for the reordering element and is set to equal the sequence number corresponding to the protocol data unit to which a reordering timer had been set.

7. The mobile terminal as claimed in claim 6, wherein the third variable is used to trigger a transfer of protocol data units to a next in sequence in a receiver function of the second radio link control (RLC) entity.

* * * * *